Feb. 25, 1969 W. K. ALLEN 3,430,237

TIME DIVISION MULTIPLEX SYSTEM

Filed Nov. 24, 1967 Sheet 1 of 3

INVENTOR.
Walter K. Allen
BY
ATTORNEYS

INVENTOR.
Walter K. Allen
BY
ATTORNEYS

*INVENTOR.*
Walter K. Allen

*BY*

ATTORNEYS

United States Patent Office 3,430,237

Patented Feb. 25, 1969

3,430,237
TIME DIVISION MULTIPLEX SYSTEM

Walter K. Allen, Silver Spring, Md., assignor to the United States of America as represented by the Administrator of the National Aeronautics and Space Administration Filed Nov. 24, 1967, Ser. No. 685,497

U.S. Cl. 343—7.5 20 Claims

Int. Cl. G01s *9/58*

ABSTRACT OF THE DISCLOSURE

This invention is a synchronizing apparatus for a multi-access satellite time division multiplex system. A master station transmits a sync burst signal to a satellite and receives the transmitted sync burst signal as reflected from the satellite. In the master station means are provided for mixing the received signal with the transmitted signal to develop a resultant frequency sum component which is compared with a standard signal to compensate for the Doppler shift between the master station and the satellite. By this operation, the sync burst signal at the satellite is at a known frequency. The reflected sync burst signal is received by a plurality of slave stations. Each slave station also includes mixing and comparing means to compensate for the Doppler shift between them and the satellite. Both the master and the slave stations use their respective received sync burst signals to control their respective transmitter and receiver format generators so that format timing is coherent at the satellite. The slave stations also include means for transmitting a stepped tone burst signal to the satellite and for receiving the reflected stepped tone burst signal from the satellite. The stepped tone burst signal is transmitted at predetermined intervals that coincide with the timing of the format of the multiplex system. When the received stepped tone burst signal is received in an open time slot at a slave station, the slave station has its transmitter format locked to within plus or minus one-half slot of the open time slot. A further means is provided in the slave station for centering the stepped tone burst signal in the open time slot. Hence, the slave station is synchronized with an open time slot in the format of the time division multiplex system.

The invention described herein was made by an employee of the United States Government and may be manufactured and used by or for the Government for governmental purposes without the payment of any royalties thereon or therefor.

BACKGROUND OF THE INVENTION

Multiplexing is well known and widely used in communication systems because it results in the greater use of communication channels. That is, multiplexing allows one channel to carry a number of "conversations" without interference between the conversations. Time division multiplexing is one form of the general art of multiplexing where a particular format has a plurality of time-related slots. Each slot can carry a "conversation." However, each conversation can only be carried on when that slot exists in the time-related slots format. Hence, it is necessary to synchronize the conversations with the slots.

While a number of systems for synchronizing time division multiplex systems are well known, these systems are not satisfactory in all environments. Specifically, a synchronizing apparatus for a time division multiplex system that operates on the ground between stationary stations is not suitable for use between ground stations and a satellite. More specifically, a satellite communication system with time division multiplexing has problems that are unresolved by the prior art.

The problems of satellite systems mainly result from the Doppler shift between the satellite and its ground stations. While some satellites are relatively synchronous with the movement of the earth and therefore stationary, they still move a small amount and create some Doppler shift problems. However, the major problem is with medium altitude satellites, such as NASA's Relay satellite, wherein the satellite is continuously moving with respect to its ground stations. The continuous movement creates a changing Doppler shift between the ground stations and the satellite. It is this varying Doppler shift that prevents prior art synchronizing systems from satisfactorily synchronizing a multi-access satellite time division multiplex system.

Therefore, it is an object of this invention to provide a new and improved synchronizing apparatus for a time division multiplex system.

It is another object of this invention to provide a new and improved synchronizing apparatus for a multiplex system.

It is also an object of this invention to provide a synchronizing apparatus for a multi-access satellite time division multiplex system.

It is still another object of this invention to provide a new and improved synchronizing apparatus that is reliable, uncomplicated, and suitable for use with a multi-access satellite time division multiplex system.

SUMMARY OF THE INVENTION

In accordance with a principle of the invention, a master station transmits a synchronizing sync burst signal to a satellite. The satellite receives the sync burst signal and re-transmits or reflects it back to the master station. The master station by phase comparison develops a signal which compensates for Doppler shift by controlling the tone of the transmitted sync signal. Specifically, because the phase difference is related to the Doppler shift, it can be used to control the tone of the transmitted sync burst signal so that the Doppler shift of the signal reflected by the satellite is compensated; that is, the signal reflected by the satellite is at a known frequency at the satellite. In this manner, the reflected signal is Doppler shift compensated with respect to the master station. This compensated signal is then used to control the timing of the master station.

In accordance with a further principle of the invention, a slave station receives the master station Doppler shift compensated signal reflected by the satellite. This signal is mixed with a local voltage controlled oscillator signal and phase compared with a standard signal in the slave station. The phase difference between these two signals is again related to the Doppler shift and is used by the slave station to control the voltage controlled oscillator and the timing of the slave station for accurate Doppler tracking.

In accordance with another principle of the invention, the slave station, after it has been Doppler shift compensated, transmits stepped tone burst signals at periods related to the timing of the multiplex format. These stepped tone bursts are received by the satellite and reflected back to the slave station's receiver. When a burst falls into an empty slot, it is detected and through appropriate devices used to perform coarse sync of the slave stations transmitter format.

In accordance with still another principle of the invention, further stepped tone burst signals transmitted by the slave station are centered in the empty slot so that fine sync between the slave station and the formerly empty slot is achieved.

It will be appreciated by those skilled in the art and others, that the invention is a relatively uncomplicated system for obtaining rapid sync between a master station and a number of slave stations in a time division multiplex system used with multi-access satellites. The system requires the transmission of a sync burst signal from the master station and the reception of the burst signal by the master station after it has been reflected by the satellite. The sync burst signal is mixed with the transmitted signal and phase compared with a standard signal; the difference between the mixed signal and the standard signal is used to compensate for the Doppler shift between the satellite and the master station. In a similar manner, the slave stations detect the sync burst signal and use it to compensate for the Doppler shift between them and the satellite. Thereafter, the slave stations generate stepped tone bursts which are used to roughly detect the location of an empty slot in the time delay multiplex format. Finally, a fine position means is provided for centering the stepped tone bursts of a slave station in an empty slot. Thereafter, the system is synchronized and the master station can communicate with the slave station via the satellite and vice versa. Also, one slave station can communicate with another slave station.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein.

DESCRIPTION OF THE PREFERRED EMBODIMENTS

Figure 1:
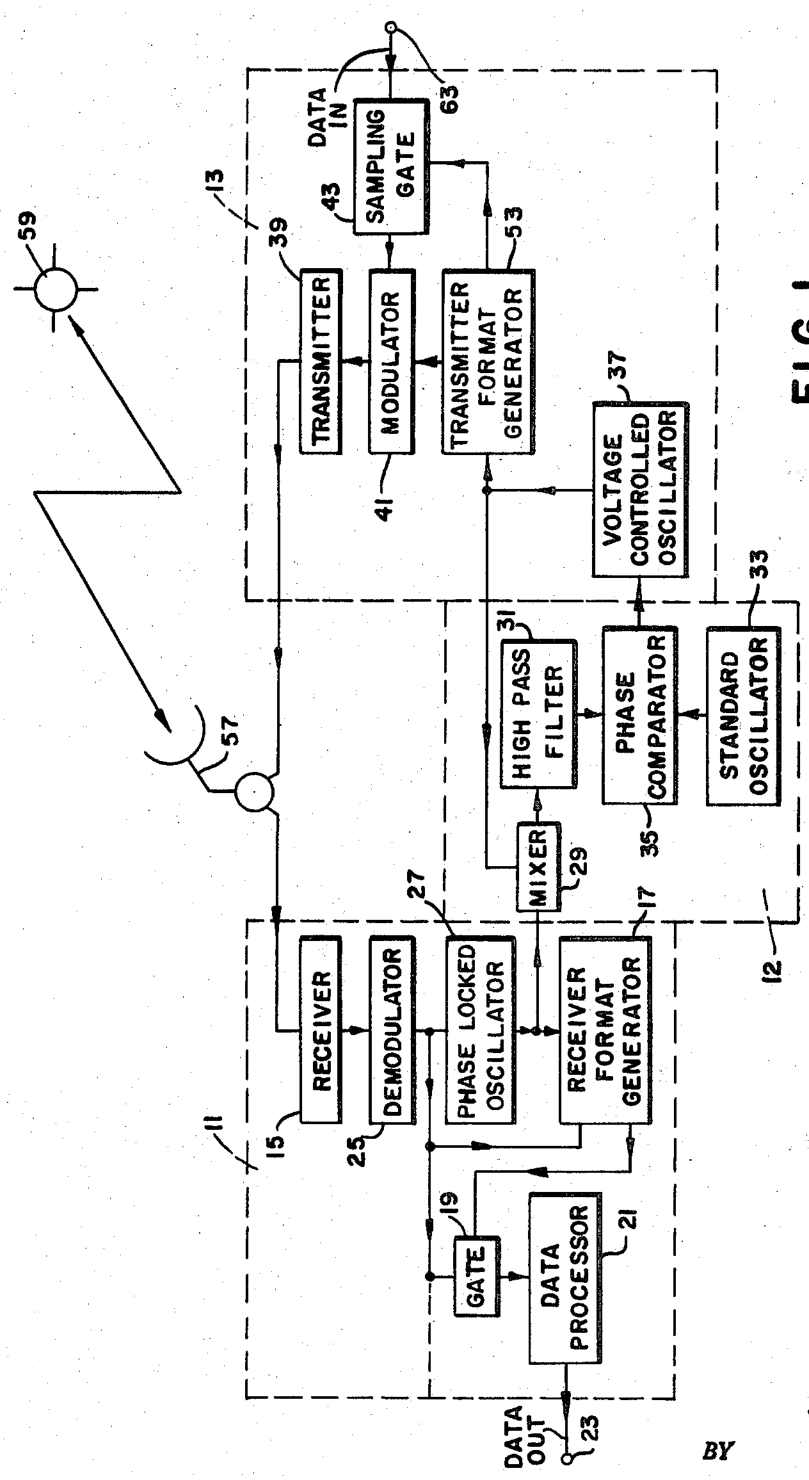
FIG. 1 is a block diagram of a master station synchronizing system made in accordance with the invention.

FIG. 1 illustrates a master station synchronizing (sync) system made in accordance with the invention and generally comprises a receiving section 11 located on the left side of the figure, a transmitting section 13 located on the right side, and a Doppler shift compensation section 12 located between the transmitting section and the receiving section. The receiving section 11 generally comprises a receiver 15, a demodulator 25, a phase locked oscillator 27, a receiver format generator 17, a gate 19, and a data processor 21. The Doppler shift compensation section 12 comprises a mixer 29, a high-pass filter 31, a standard oscillator 33, and a phase comparator 35. The transmitting section 13 generally comprises a transmitter 39, a modulator 41, a voltage controlled oscillator (VCO) 37, a sampling gate 43, and a transmitter format generator 53.

In addition to the transmitting and receiving sections illustrated in FIG. 1, there is also illustrated an antenna 57 and a satellite 59. The output from the antenna 57 is connected through a suitable diplexer to the input of the receiver 15 and the output of the receiver 15 is connected to the input of the demodulator 25. The output of the demodulator is connected to the input of the phase locked oscillator 27, the data input of the gate 19 and a signal input of the receiver format generator 17. The output of the phase-locked oscillator 27 is connected to one input of the mixer 29 and to a second input of the receiver format generator 17. The output of the receiver format generator 17 is connected to the control input of the gate 19. The output of the gate is connected through the data processor 21 to a data output terminal 23.

The output of the mixer 29 is connected through high-pass filter 31 to one input of phase comparator 35. The output of the standard oscillator 33 is connected to a second input of phase comparator 35. The output of phase comparator 35 is connected to the voltage-controlled oscillator 37 which output in turn is connected to a second input of the mixer 29 and to the input of the transmitter format generator 53.

One output of the transmitter format generator 53 is connected through the modulator 41 to the input of the transmitter 39. A second output of the transmitter format generator 53 is connected to the control input of the sampling gate 43. The signal input of the sampling gate 43 is connected to a data input terminal 63. The output of the sampling gate 43 is connected to a second input of the modulator 41. Finally, the output of the transmitter 39 is connected through a suitable diplexer to the antenna 57.

Initially, the VCO 37 is generating a signal consisting of a standard tone minus the master stations predicted Doppler shift. The output of the voltage-controlled oscillator 37 controls the timing signals generated by the transmitter format generator 53. These timing signals are the two outputs from transmitter generator 53. One output is the sync burst signal which is modulator onto a transmit carrier signal (derived from modulator 41 or an external oscillator as the case may be) by the modulator 41 and are passed as synchronizing burst signals to the transmitter 39. The burst signals are at some standard frequency such as 800 kc., for example, minus the master station's predicted Doppler shift. These sync burst signals are transmitted by the transmitter 39 through the antenna 57 to the satellite 59 and reflected by the satellite back to the antenna 57.

The return signal contains the 800 kc. standard signal (minus the predicted Doppler shift) plus the Doppler shift from the master station's antenna to the satellite and the Doppler shift from the satellite to the antenna. The signal passes through the receiver and is applied to the demodulator 21. The demodulator generates a control signal that is related to the tone of the return signal and applies it to the phase-locked oscillator 27. Hence, the phase-locked oscillator is controlled by the reflected signal's tone.

The output from the phase-locked oscillator is mixed in the mixer 29 with the output from the VCO 37. The sum product of the two signals passes through the high-pass filter 31 and is applied to the phase comparator 35. The standard oscillator 33 which generates a signal at twice the standard tone (1600 kc. for the 800 kc. example) applies its output signal to the second input of the phase comparator 35. The output from the phase comparator is now related to the true Doppler shift between the master station and the satellite and is applied to and controls the output of the VCO 37. Hence, further signals generated by the VCO 37 are Doppler shift compensated. That is, the phase error is used to correct the initial standard tone signal minus the predicted Doppler shift, generated by the VCO 37, so that the system is continuously accurately Doppler tracking the satellite. This corrected VCO signal drives the clock so that a true standard tone is received by the satellite and retransmitted by it.

By continuously compensating for the Doppler shift between the master station and the satellite, the signal received at the satellite and retransmitted by the satellite is at a known frequency. This "pre-Doppler corrected" signal eliminates the necessity for the satellite to contain a standard frequency source.

It will be appreciated by those skilled in the art that the foregoing is a relatively uncomplicated system for synchronizing a master station with a satellite so that the satellite reflects a sync signal that is at a known frequency. The system requires the generation and transmission of a signal at a standard tone minus a predicted Doppler shift. This signal is received by the satellite and reflected back to the master station. The master station then demodulates the received signal and utilizes this demodulated signal to control a phase-locked oscillator. The oscillator's output signal is then mixed with the signal that was initially generated. The sum output from the mixer is phase compared with a standard signal and the phase compared signal is used to control the VCO that initially generated the sync signal. Thereafter, the master station is synchronized and the signal received and retransmitted by the satellite is at the standard tone, i.e., it is Doppler shift compensated.

After the master station is synchronized, it can transmit data received at its data input terminal 63. This data is applied to the sampling gate 43 and modulated onto the transmit carrier signal by the modulator 41. The output from the modulator is applied to the transmitter and the data is transmitted to the satellite via the antenna. The transmitter format generator 53 controls the sampling gate so that the transmitting system is synchronized with slots in the time division multiplex format.

Data received from the satellite is applied through the receiver and the demodulator to the gate 19 which is controlled by the receiver format generator. The output data from the gate is processed by the data processor and applied to the data output terminal 23. While only a single gate, data processor, and output terminal are illustrated in FIG. 1, it will be appreciated by those skilled in the art that this is merely representative. A plurality of data processors are used if the master station communicates with a plurality of slave stations with each data processor being gated by a gate controlled by the receiver format generator so that the appropriate data processor receives data from the slave station which is assigned to a predetermined time slot in the time division multiplex format.

Figure 4:
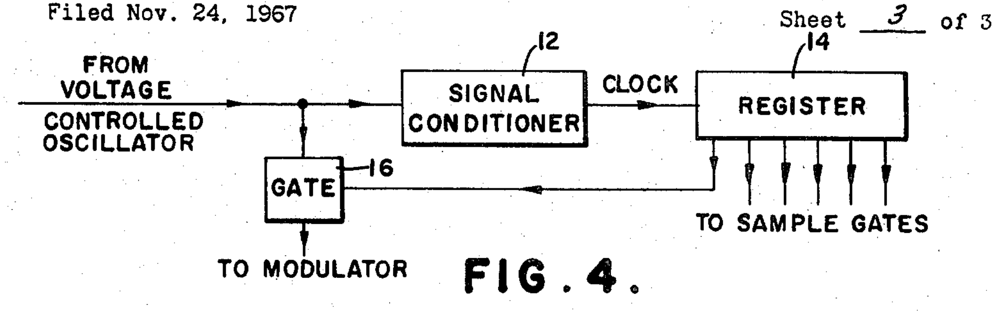
FIG. 4 is a block diagram of a master transmitter format generator.

An example of a master transmitter format generator suitable for use in the invention is illustrated in FIG. 4 and comprises a signal conditioner 12, a register 14, and a gate 16. The output from the voltage controlled oscillator 37 illustrated in FIG. 1 is connected to the input of the signal conditioner 12 and the signal input of the gate 16. The output of the signal conditioner 12 is connected to the input of the register 14 to provide the register 14 with a clock signal. The register 14 has a plurality of tapped outputs. One of these outputs is connected to the gating input of the gate 16. The output from the gate 16 is adapted for connection to the modulator 41 illustrated in FIG. 1. The other tapped outputs of the register 14 are connected to the sample gates as illustrated by the connection to the sample gate 43 of FIG. 1. Hence, the transmitter format generator of the master station is basically a register driven by clock signals from the VCO 37. The clock signals are passed through the signal conditioner 12 and gating signals are obtained by tapping the register 14 at appropriate stages of the register.

The format generator also controls the production of the master sync burst signal. The master sync burst signal is obtained by appropriately gating the clock signal from the VCO. This gating is obtained as illustrated in FIG. 4 by tapping one output of the register and connecting it to a gate 16. That is, the clock signal is gated in the same manner as the sample gates are gated. And, this gating of the clock signal provides a master sync burst signal.

It should be noted that the format generator illustrated in FIG. 4 is synchronized in frequency, but not in phase. Because this is the basic source of sync signals for the entire time delay multiplex system, all other units must synchronize to it, therefore, the phase of this unit is arbitrary.

Figure 5:
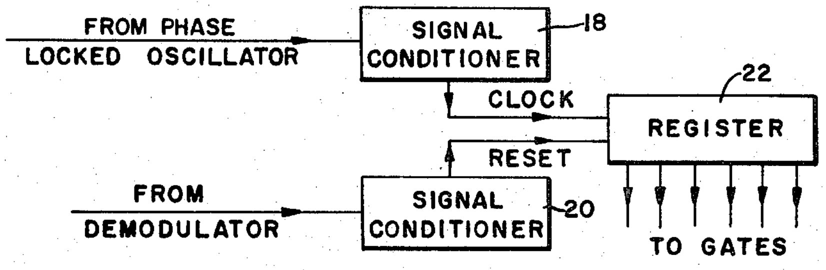
FIG. 5 is a block diagram of a receiver format generator.

FIG. 5 illustrates a receiver format generator that can be used with the master station illustrated in FIG. 1 or the slave station illustrated in FIG. 2 and hereinafter described. The receiver format generator illustrated in FIG. 5 comprises a first signal conditioner 18, a second signal conditioner 20 and a register 22. The input to the first signal conditioner 18 is connected to the output of the phase locked oscillator and the input to the second signal conditioner 20 is connected to the output of the demodulator. The output of the first signal conditioner 18 is a clock signal and it is applied to the clock input of the register 22. The output of the second signal conditioner 20 is a reset signal and it is applied to the reset input of the register 22. The outputs of the register 22 are gating signals that are created by tapping appropriate stages of the register. The output signals from the register are applied to the gates as illustrated in FIGS. 1 and 2.

The clock signals from the first signal conditioner 18 are used to frequency lock the format generator and the sync burst signal is used to phase lock the format generator. The first signal conditioner 18 illustrated in FIG. 5 could be an amplifier, a limiter or other signal conditioning device. The second signal conditioner 20 could be a band pass filter, an envelope detector, a threshold detector, an amplifier, a limiter, or other signal conditioning device. Or, alternatively either signal conditioner could comprise a combination of these signal conditioning elements.

Figure 3:
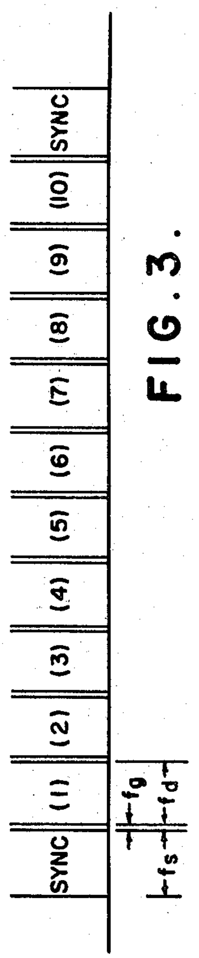
FIG. 3 is a 10-slot format diagram for a time division multiplex system suitable for use with the invention.

One possible format for the time-division multiplex system of the invention is illustrated in FIG. 3 and comprises a synchronizing slot of length $f_s$ followed by 10-data slots of length $f_d$. The slots are all separated by guard bands of length $f_g$. The sync bursts occur in the sync slot and, as hereinafter described above, are used for Doppler shift compensation. And, the stepped tone bursts are used to place a slave station in an empty data slot. It should be noted that the format illustrated in FIG. 3 is only an example of a format suitable for use with the invention. Numerous other suitable formats will be apparent to those skilled in the art.

Figure 2:
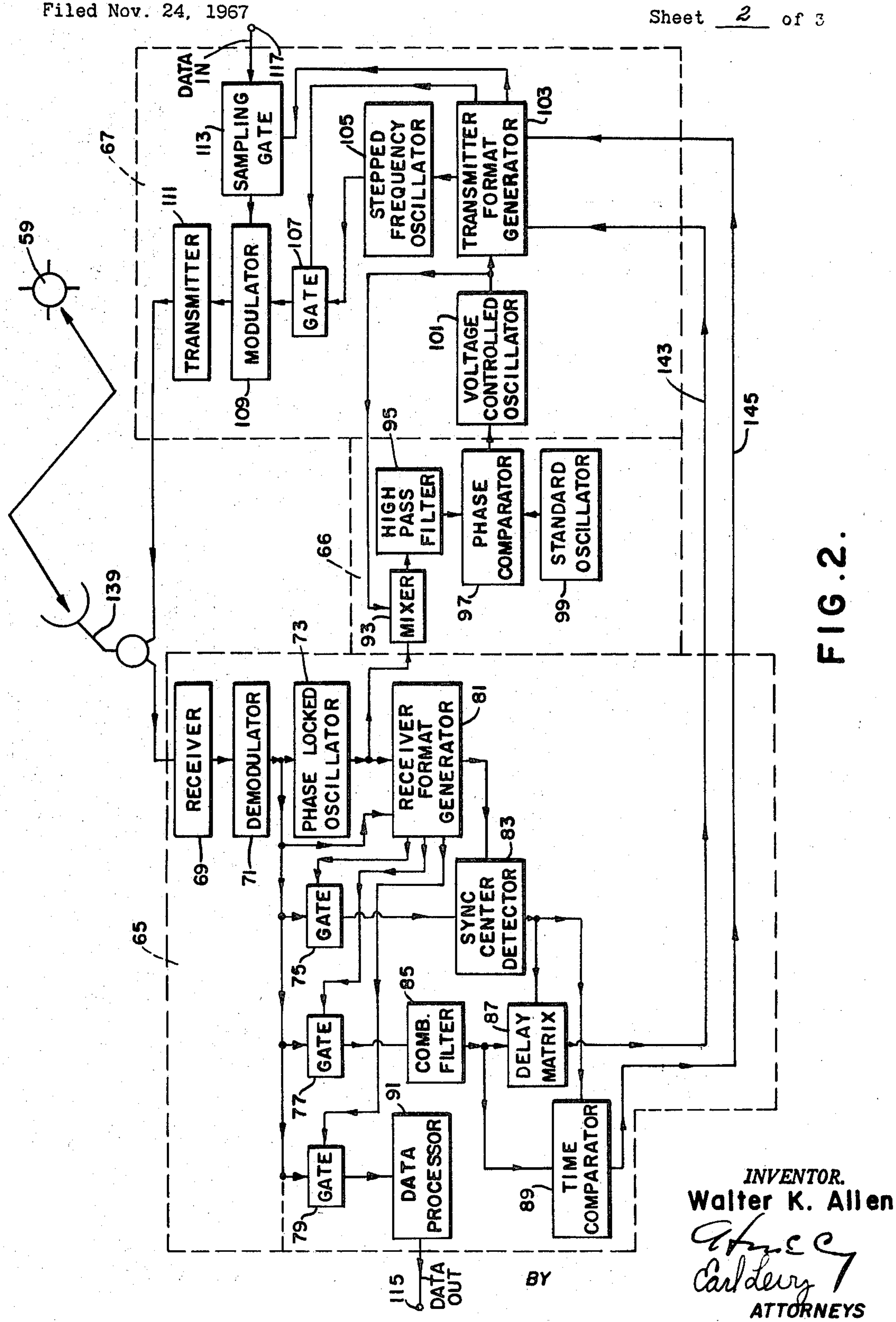
FIG. 2 is a block diagram of a slave station synchronizing system made in accordance with the invention.

FIG. 2 illustrates in block form a slave station synchronizing (sync) system made in accordance with the invention and generally comprises a receiving section 65 located no the left side of the figure, a transmitting section 67 located on the right side of the figure and a Doppler compensation section 66 located between the transmitting and receiving sections. The slave station receiving section 65 generally comprises a receiver 69, a demodulator 71, a phase-locked oscillator 73, first, second and third gates 75, 77 and 79, a receiver format generator 81, a sync center detector 83, a comb filter 85, a delay matrix 87, a time comparator 89, and a data processor 91.

The Doppler compensation section 66 comprises a mixer 93, a high pass filter 95, a phase comparator 97, and a standard oscillator 99. And, the transmitting section 67 comprises a voltage controlled oscillator (VCO) 101, a transmitter format generator 103, a stepped frequency oscillator 105, a gate 107, a modulator 109, a transmitter 111, and a sampling gate 113.

In addition to the transmitting and receiving sections of the slave station, the embodiment illustrated in FIG. 2 also includes an antenna 139 and the satellite 59. The antenna 139 includes suitable diplexing means.

The output from the antenna 139 is connected through its diplexer to the input of the receiver 69 and the output from the receiver is connected to the input of the demodulator 71. The output of the demodulator 71 is connected to the input of the phase-locked oscillator 73, to the signal inputs of the first, second and third gates 75, 77 and 79, and to an input of the receiver format generator 81.

The output of the phase-locked oscillator 73 is connected to one input of the mixer 93 and to a second input of the receiver format generator 81. The mixer 93 has a second input connected to the output of the VCO 101 and the output of the mixer is connected through the high-pass filter 95 to one input of the phase comparator 97. The output of the standard oscillator 99 is connected to the second input of the phase comparator 97 and the output of the phase comparator is connected to the control input of the VCO 101.

The receiver format generator has four outputs, three outputs are separately connected to the control or gating inputs of the first, second and third gates 75, 77 and 79. The fourth output is connected to one input of the sync center detector 83.

The output of the first gate 75 is connected to the second input of the sync center detector 83 and the output of the sync center detector is connected to one input of the delay matrix 87 and to one input of the time comparator 89. The output of the second gate 77 is connected to the input of the comb filter 85 and the output of the comb filter is connected to the second input of the delay matrix 87 and to the second input of the time comparator 89.

The output of the third gate 79 is connected through the data processor 91 to a data output terminal 115.

The output of the delay matrix 87 is connected via a first conductor 143 to a first control input of the transmitter format generator 103. The output of the time comparator 89 is connected via a second conductor 145 to a second control input of the transmitter format generator 103. And, the output of the VCO 101 is connected to a third input of the transmitter format generator 103.

The transmitter format generator has: a first output connected to the input of the stepped frequency oscillator 105; a second output connected to the gating input of the gate 107; and, a third output connected to the gating input at the sampling gate 113.

The output of the stepped frequency oscillator is connected to the signal input of the gate 107, and a data input terminal 117 is connected to the input of the sampling gate 113. The outputs of the gate 107 and the sampling gate 113 are separately connected to separate inputs of the modulator 109. The output of the modulator 109 is connected through the transmitter 111 to the diplexer of the antenna 139.

In operation, the slave station's receiver 69 receives the master station Doppler shift compensated sync burst signals originating at the master station and transmitted via the satellite 59. Because of the compensation created by the master station, this signal at the satellite is at a known frequency, i.e., it is a standard frequency signal. As with the master station, the signal received by the slave station is applied to the demodulator 71 and is demodulated. This demodulated signal controls the frequency of the signal generated by the phase-locked oscillator 73. The phase-locked oscillator's signal is mixed in the mixer with the output from the VCO 101 which, as with the master station signal, is equal to the standard signal reflected by the satellite minus a predicted Doppler shift from the satellite to the slave station. The sum portion of the mixed signals is passed through the high-pass filter 95. As with the master station, the standard oscillator 99 generates a signal at twice the frequency of the sync signal. Both of these double frequency signals are phase compared in the phase comparator 97. The output of the phase comparator controls the frequency of the signal generated by the voltage-controlled oscillator 101 so that the slave station's transmitter format generator is frequency synchronized with the master station via the satellite.

After the frequency synchronization step is completed, a coarse phase sync step occurs. This coarse phase sync step synchronizes the format of transmitter format generator 103 to the system format to within plus or minus one-half slot. Specifically, the transmitter format generator controls the stepped frequency oscillator 105 so that it generates stepped tone burst signals that are gated by the gate 107 to the modulator 109. The gating occurs so that the tone signals are transmitted at appropriate periods in the time division format.

The stepped frequency oscillator generates a stepped tone burst signal that is equal in length to the length $f_d$ of one of the data slots of the format illustrated in FIG. 3. The gate in combination with the transmitter format generator controls the length and position of each stepped tone burst so that there is minimum interference between data channels. That is, so that minimum interference occurs, the bursts are limited to the length of a slot. To further prevent interference, only one burst signal for each frame is generated. For example, the first frame following the timing sync step may include a burst signal in the first slot, the second frame may include a burst signal in the second slot and the third may include a burst signal in the third slot, etc. Hence, interference is prevented by having a burst in only one slot per frame rather than having burst signals in all of the slots of a frame.

The transmitted stepped tone burst signals from the slave station are received by the satellite 59 and re-transmitted or reflected by it back to the slave station antenna 139. The reflected stepped tone burst signals are passed through the receiver and to the demodulator 71 which demodulates all incoming signals.

The stepped tone burst signals are gated by the second gate 77 under the control of the receiver format generator to the comb filter 85 while the sync burst signals are gated by the first gate 75 to the sync center detector 75. The comb filter applies the stepped tone burst signals to the delay matrix 87. The sync center detector also applies signals to the delay matrix. The center signals and the comb signals are compared in the delay matrix and the delay matrix generates an output signal according to the phase error between the system format and the transmit format of transmitter format generator 103.

The matrix delay signal is a control signal that passes along the conductor 143 to the transmitter format generator 103. The transmitter format generator uses the control signal to correct the phase of its format and to cancel all further stepped tone bursts except those timed to an empty data slot. At this point, the slave station is synchronized to within plus or minus one-half a slot of the empty slot. That is, after coarse sync, stepped tone burst signals overlap, no more than two slots with one of the two slots being the empty slot.

Further, stepped tone burst signals passing through the comb filter 85 are compared with the sync center detector signal in the time comparator 89. The sync center detector generates a center signal that occurs in the center of the empty data slot and the time comparator compares that signal with the center of the received stepped tone burst signal. This time comparison generates an output signal that passes along conductor 145 to the transmitter format generator 103 as a fine position sync error signal. The transmitter format generator uses this error signal to center the slave station in the empty slot. Thereafter, the slave station is synchronized to the formerly empty slot.

It will be appreciated that the synchronizing of the slave station with the master station is relatively uncomplicated; only three steps are necessary to accurately sync the slave station. These steps are: (1) time synchronization of the slave station with the master station to compensate for Doppler shift; (2) coarse synchronization of the slave station with system format; and (3) fine synchronization of the slave station to center the slave station in the empty slot.

As with the master station, the third gate 79 is gated on to pass data to the data processor 91. Also, as with the master station, only one data gate and one data processor are illustrated in FIG. 2; however, a plurality of such units may be provided depending upon the number of slave stations data, in addition to the master station data, any particular slave station desires to receive. Further, more than one transmit data channel can be connected to the modulators of the master and slave stations. However, each data channel must be gated by the transmitter format generator through a sampling gate.

Figure 6:
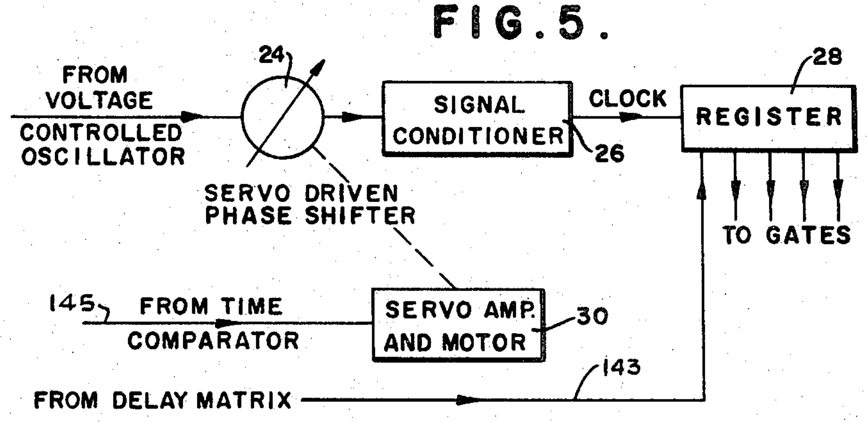
FIG. 6 is a block diagram of a slave transmitter format generator.

FIG. 6 is an example of a slave transmitter format generator suitable for use in the slave station illustrated in FIG. 2. The slave transmitter form at generator illustrated in FIG. 6 comprises a servo-driven phase shifter 24, a signal conditioner 26, a register 28, and a servo-amplifier and motor 30.

The output from the voltage controlled oscillator 101 illustrated in FIG. 2 is connected to the input of the servo-driven phase shifter 24. The output of the servo-driven phase shifter 24 is connected through the signal conditioner 26 to the clock input of the register 28. The output from the time comparator 89, illustrated in FIG. 2, is connected to the input of the servo-amplifier and motor 30 which controls the servo-driven phase shifter 24. In addition, the output from the delay matrix 87 of FIG. 2 is connected to a control input of the register 28. The output of the register 28 is connected to the various gates illustrated in FIG. 2.

It will be appreciated that the slave transmitter format generator illustrated in FIG. 2 is basically a register driven by the clock signals from the VCO 101 after these clock signals are signal conditioned. Prior to siganl conditioning by the signal conditioner 26, the clock signals are phase shifted by the servo driven phase shifter 24 to advance or retard the phase of the clock signal. This advancement or retarding provides fine phase synchronization by the transmitter format generator.

The register illustrated in FIG. 6 advances or retards one burst position ($f_d+f_g$) every ten frames until a signal is received on conductor 143 indicating coarse phase sync. At this time the register follows the standard format and disables all but one tone (frequency) in the stepped frequency oscillator 105 illustrated in FIG. 2. This procedure of advancing or retarding allows the format frame of the slave transmit format generator to drift at a constant rate through all the system form at until coarse phase sync is acquired.

Figure 7:
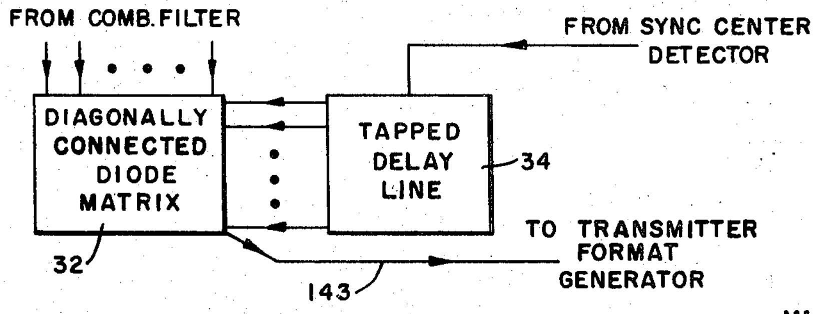
FIG. 7 is a block diagram of a delay matrix.

FIG. 7 illustrates more clearly how the delay matrix 87 of FIG. 2 provides a coarse sync signal. The delay matrix illustrated in FIG. 7 comprises a diagonally connected diode matrix 32 and a tapped delay line 34. The outputs from the comb filter 85 illustrated in FIG. 2 are connected along one axis of the diagonally connected diode matrix 32. The output from the sync center detector 83 of FIG. 2 is connected to the input of the tapped delay line 34. The tap outputs of the tapped delay line 34 are connected to the second axis of the diagonally connected diode matrix 32. And, the single diagonal output of the diagonally connected diode matrix 32 is connected to the conductor 143 which is in turn connected to the transmitter format generator 103 as illustrated in FIG. 2.

The taps on the delay line are spaced one burst position apart to correspond to the burst position outputs of the comb filter 85. And, when there is a comparison between these two signals, an output along line 143 signals coarse phase sync as hereinabove described.

It will be appreciated by those skilled in the art that an almanac will be included in the master and slave stations to control the initial turn-on of the systems so that the systems only operate when the satellite 59 is within the range of transmission of the stations. That is, a medium altitude satellite is only used for communication purposes when it is located within the line of sight of the antenna of the master and slave stations. The almanac predicts when the satellite is in this location and turns on the system so that the master station and slave station can be synchronized. After synchronization, the master station can communicate with any slave station and vice versa. In addition, slave stations can communicate between each other.

It will be appreciated by those skilled in the art and others that although the foregoing has merely described one embodiment of the invention, numerous other embodiments and variations of the invention are apparent. The invention generally requires compensation for the Doppler shift of both the master and slave stations, coarse synchronization of the slave stations, receive and transmit formats with the front of the time divsion, multiplex system and the synchronization of each slave station in an empty slot. Hence, various modifications may be made within the scope of this disclosure.

What is claimed is:

1. Apparatus for synchronizing a multi-access satellite time division multiplex system comprising:
- master station means for transmitting a synchronizing signal to said satellite and for receiving the transmitted synchronizing signal reflected by said satellite and for comparing said transmitted and received signals to generate a control signal for controlling the transmitted signal so that the signal received and reflected by said satellite is Doppler shift compensated and at a known frequency; and
- slave station means for receiving the signal reflected by said satellite and for generating a control signal to compensate for the Doppler shift between said slave station and said satellite and including means for synchronizing said slave station in a slot in the time division multiplex format.

2. Apparatus as claimed in claim 1 wherein said master station means includes:
- master transmitting means for transmitting signals to said satellite;
- master receiving means for receiving signals from said satellite; and
- master Doppler shift compensating means connected to said master transmitting means and said master receiving means for compensating for the Doppler shift between said master station and said satellite.

3. Apparatus as claimed in claim 2 wherein said master receiving means includes:
- a master receiver adapted for connection to the output of a master antenna;
- a master demodulator connected to the output of said master receiver;
- a master phase-locked oscillator connected to the output of said master demodulator; and
- a master receiver format generator connected to the output of said master phase-locked oscillator and to the output of said master demodulator.

4. Apparatus as claimed in claim 3 wherein said master receiving means also includes:
- a master gate having its control input connected to the output of said master format generator and its signal input connected to the output of said master demodulator; and
- a master data processor connected to the output of said master gate.

5. Apparatus as claimed in claim 4 wherein said master Doppler shift compensating means comprises:
- a master mixer connected to the output of said master phase-locked oscillator and to said master transmitting means;
- a master high pass filter connected to the output of said master mixer;
- a master phase comparator having one input connected to the output of said master high pass filter; and
- a master standard oscillator having its output connected to the second input of said master phase comparator.

6. Apparatus as claimed in claim 5 wherein said master transmitting means comprises:
- a master transmitter having its output adapted for connection to the input of said master antenna;
- a master modulator having its output connected to the input of said master transmitter;
- a master sampling gate having its signal input connected to a data input terminal and its output connected to said master modulator;
- a master transmitter format generator having its output connected to a second input of said master modulator; and a master voltage controlled oscillator having its input connected to the output of said master phase comparator and its output connected to the input of said master transmitter format generator and to the second input of said master mixer.

7. Apparatus as claimed in claim 6 wherein said slave station means comprises;

Doppler shift compensating means for compensating for the Doppler shift between said slave station and said satellite;

slave receiving means having an input adapted for connection to the output of a slave antenna and an output connected to said slave Doppler shift compensating means; and a slave transmitting means having an output adapted for connection to the input of said slave antenna and an input connected to said slave Doppler shift compensating means.

8. Apparatus as claimed in claim 7 wherein said slave receiving means comprises:

a slave receiver having its input adapted for connection to the output of said slave antenna;

a slave demodulator having its input connected to the output of said slave receiver;

a slave phase-locked oscillator having its input connected to the output of said slave demodulator; and a slave receiver format generator having one input connected to the output of said slave demodulator and a second input connected to the output of said slave phase-locked oscillator.

9. Apparatus as claimed in claim 8 wherein said slave Doppler compensating means comprises:

a slave mixer having an input connected to the output of said slave phase-locked oscillator and a second input connected to said slave transmitting means;

a slave high pass filter having its input connected to the output of said slave mixer;

a slave standard oscillator; and a slave phase comparator having one input connected to the output of said slave high pass filter and a second input connected to the output of said slave standard oscillator.

10. Apparatus as claimed in claim 9 wherein said slave transmitting means comprises:

a slave transmitter having its output adapted for connection to the input of said slave antenna;

a slave modulator having its output connected to the input of said slave transmitter;

a slave sampling gate having its signal input connected to a data input gate and its output connected to said slave modulator;

a slave transmitter format generator having one output connected to said slave modulator and a second output connected to the control input of said slave sampling gate; and a slave voltage controlled oscillator having an input connected to the output of said slave phase comparator and having an output connected to the input of said slave transmitter format generator and to the second input of said slave mixer.

11. Apparatus as claimed in claim 10 wherein said slave transmitting means also includes:

a slave gate and a slave stepped frequency oscillator connected in series between said slave transmitter format generator and said slave modulator, the control input of said slave gate connected to a further output of said trasmitter format generator.

12. Apparatus as claimed in claim 11 wherein said slave receiving means also comprises:

first, second and third gates having their inputs all connected to the output of said slave demodulator and their control inputs connected to separate outputs of said slave receiver format generator;

a sync center detector having one input connected to the output of said first gate and a second input connected to the output of said receiver format generator;

a comb filter connected to the output of said second gate;

a delay matrix having one input connected to the output of said comb filter and a second input connected to the output of said sync center detector;

a time comparator having one input connected to the output of said comb filter and a second input connected to the output of said sync center detector; and a pair of conductors connecting the outputs of said delay matrix and said time comparator to separate inputs of said transmitter format generator.

13. Apparatus as claimed in claim 12 wherein said slave receiving means also comprises:

a slave data processor having its input connected to the output of said third gate.

14. Apparatus as claimed in claim 1 wherein said slave station means comprises:

Doppler shift compensating means for compensating for the Doppler shift between said slave station and said satellite;

slave receiving means having an input adapted for connection to the output of a slave antenna and an output connected to said slave Doppler shift compensating means; and a slave transmitting means having an output adapted for connection to the input of said slave antenna and an input connected to said slave Doppler shift compensating means.

15. Apparatus as claimed in claim 14 wherein said slave receiving means comprises:

a slave receiver having its input adapted for connection to the output of said slave antenna;

a slave demodulator having its input connected to the output of said slave receiver;

a slave phase-locked oscillator having its input connected to the output of said slave demodulator; and a slave receiver format generator having one input connected to the output of said slave demodulator and a second input connected to the output of said slave phase-locked oscillator.

16. Apparatus as claimed in claim 15 wherein said slave Doppler compensating means comprises:

a slave mixer having an input connected to the output of said slave phase-locked oscillator and a second input connected to said slave transmitting means;

a slave high pass filter having its input connected to the output of said slave mixer;

a slave standard oscillator; and a slave phase comparator having one input connected to the output of said slave high pass filter and a second input connected to the output of said slave standard oscillator.

17. Apparatus as claimed in claim 16 wherein said slave transmitting means comprises:

a slave transmitter having its output adapted for connection to the input of said slave antenna;

a slave modulator having its output connected to the input of said slave transmitter;

a slave sampling gate having its signal input connected to a data input and its output connected to said slave modulator;

a slave transmitter format generator having one output connected to said slave modulator and a second output connected to the control input of said slave sampling gate; and a slave voltage controlled oscillator having an input connected to the output of said slave phase comparator and having an output connected to the input of said slave transmitter format generator and to the second input of said slave mixer.

18. Apparatus as claimed in claim 17 wherein said slave transmitting means also includes:

a slave gate and a slave stepped frequency oscillator connected in series between said slave transmitter format generator and said slave modulator, the control input of said slave gate connected to a further output of said transmitter format generator.

19. Apparatus as claimed in claim 18 wherein said slave receiving means also comprises:

first, second and third gates having their inputs all connected to the output of said slave demodulator and their control inputs connected to separate outputs of said slave receiver format generator;

a sync center detector having one input connected to the output of said first gate and a second input connected to the output of said receiver format generator;

a comb filter connected to the output of said second gate;

a delay matrix having one input connected to the output of said comb filter and a second input connected to the output of said sync center detector;

a time comparator having one input connected to the output of said comb filter and a second input connected to the output of said sync center detector; and a pair of conductors connecting the outputs of said delay matrix and said time comparator to separate inputs of said transmitter format generator.

20. Apparatus as claimed in claim 19 wherein said slave receiving means also comprises:

a slave data processor having its input connected to the output of said third gate.

References Cited

UNITED STATES PATENTS

| | | | |
|---|---|---|---|
| 3,317,909 | 5/1967 | Waetjen. | |
| 3,320,611 | 5/1967 | Sekimoto et al. | |
| 3,378,837 | 4/1968 | Graves | 343—7.5 |

RODNEY D. BENNETT, Jr., *Primary Examiner.*

T. H. TUBBESING, *Assistant Examiner.*

U.S. Cl. X.R.

343—100